US012635816B2

(12) United States Patent
Wood et al.

(10) Patent No.: US 12,635,816 B2
(45) Date of Patent: May 26, 2026

(54) MODIFIABLE BAGGING STRUCTURE

(71) Applicant: Toshiba Global Commerce Solutions, Inc., Durham, NC (US)

(72) Inventors: Kimberly A. Wood, Raleigh, NC (US);
Brad M. Johnson, Raleigh, NC (US);
Suzanne M. Bleakley, Cary, NC (US);
William L. Dungan, Cary, NC (US)

(73) Assignee: TOSHIBA GLOBAL COMMERCE SOLUTIONS, INC., Durham, NC (US)

( * ) Notice: Subject to any disclaimer, the term of this patent is extended or adjusted under 35 U.S.C. 154(b) by 489 days.

(21) Appl. No.: 18/163,194

(22) Filed: Feb. 1, 2023

(65) Prior Publication Data

US 2024/0251970 A1     Aug. 1, 2024

(51) Int. Cl.
| | |
|---|---|
| *A47F 9/04* | (2006.01) |
| *G06Q 20/18* | (2012.01) |
| *G06Q 20/20* | (2012.01) |

(52) U.S. Cl.
CPC .............. *A47F 9/047* (2013.01); *A47F 9/042* (2013.01); *G06Q 20/18* (2013.01); *G06Q 20/208* (2013.01)

(58) Field of Classification Search
None
See application file for complete search history.

(56) References Cited

U.S. PATENT DOCUMENTS

| | | | | |
|---|---|---|---|---|
| 3,552,697 A | * | 1/1971 | Pinto | ................... B65B 67/1266 248/97 |
| 3,579,959 A | * | 5/1971 | Bossetta | ................. A47F 10/02 53/391 |
| 3,678,660 A | * | 7/1972 | Musser | .................... B65B 67/04 53/391 |
| 4,274,245 A | * | 6/1981 | Langen | ................... B65B 5/022 53/558 |
| 4,373,611 A | * | 2/1983 | Frederick | ................ B62B 3/148 186/64 |
| 5,168,961 A | * | 12/1992 | Schneider | ................ A47F 9/047 186/60 |
| 5,525,786 A | * | 6/1996 | Dumont | ............. G06K 7/10871 186/59 |
| 5,690,228 A | * | 11/1997 | DeMatteis | ........... B65D 33/001 206/806 |
| 5,705,986 A | * | 1/1998 | Zschirnt | ............. G08B 13/2411 340/572.3 |
| 7,516,820 B1 | * | 4/2009 | Cox | ...................... A47F 13/085 211/85.15 |
| 7,546,250 B1 | * | 6/2009 | Brosnan | ................. G06Q 20/20 198/459.7 |
| 11,727,224 B1 | * | 8/2023 | Maricic | .................. G06Q 20/18 235/375 |
| 2005/0114216 A1 | * | 5/2005 | Lantz | ...................... A47F 9/046 705/16 |

(Continued)

*Primary Examiner* — Fateh M Obaid
(74) *Attorney, Agent, or Firm* — Patterson + Sheridan, LLP; Gero G. McClellan

(57) ABSTRACT

The present disclosure provides a checkout system and bagging structure. The bagging structure includes a body, a platform positioned on the body, and a power source disposed within the body. The platform defines a plurality of cavities arranged in a grid. A first cavity of the plurality of cavities receives a first mechanical rod. The power source provides electric power through the first cavity and to the first mechanical rod.

16 Claims, 12 Drawing Sheets

(56)           References Cited

U.S. PATENT DOCUMENTS

| | | | |
|---|---|---|---|
| 2005/0183402 A1* | 8/2005 | Ball | B65B 43/52 |
| | | | 53/391 |
| 2006/0076406 A1* | 4/2006 | Ulrich | G06Q 20/208 |
| | | | 235/383 |
| 2006/0185936 A1* | 8/2006 | Kaneko | A47F 9/047 |
| | | | 186/61 |
| 2009/0192902 A1* | 7/2009 | Cox | G07G 1/0054 |
| | | | 705/16 |
| 2011/0259952 A1* | 10/2011 | Yamada | A47F 9/047 |
| | | | 235/375 |
| 2017/0076559 A1* | 3/2017 | Osmon | G07G 1/0027 |
| 2017/0355531 A1* | 12/2017 | Bacallao | A47F 9/047 |
| 2018/0049565 A1* | 2/2018 | Bacallao | F24F 11/30 |
| 2019/0241298 A1* | 8/2019 | Brooks | A47F 9/04 |
| 2025/0308349 A1* | 10/2025 | Brown | G07G 1/0072 |

* cited by examiner

800

MODIFIABLE BAGGING STRUCTURE

BACKGROUND

The present disclosure relates to checkout systems, and more specifically, to bagging stations of checkout systems. Different retailers have different needs for their bagging stations. For example, some retailers may provide plastic bags to their customers, while other retailers may instead encourage their customers to bring a reusable bag. Certain retailers may use paper bags instead of plastic bags, and some retailers may provide storage shelves at bagging stations to hold items and bags. Due to these diverse needs, it may be difficult to find a bagging station that meets the needs of multiple retailers. Instead, existing retailers typically order custom bagging stations that meet the needs of the retailers, but if the retailers' needs ever change, then the custom bagging stations may not satisfy those needs.

DETAILED DESCRIPTION

The present disclosure describes a checkout system (e.g., a self-checkout system) that includes a bagging station. The bagging station includes a modifiable bagging structure with a top surface that defines a grid or array of cavities. Various stanchions (e.g., bag stanchions and shelf stanchions) may be inserted and secured through the cavities. The stanchions and the position of the stanchions may be varied by inserting and securing different stanchions through different cavities of the bagging structure. Additionally, the modifiable bagging structure may include a power source that supplies electrical power to the stanchions.

Technical Advantages

The modifiable bagging structure allows for different retailers to set up their bagging stations to meet their different needs. For example, a retailer that wants to encourage its customers to bring reusable bags may set up its bagging stations with stanchions for reusable bags rather than with stanchions that supply plastic bags. As another example, the retailer may adjust the positioning of the stanchions in the bagging station to suit the retailer's needs. Additionally, the stanchions may include lights that provide signals and messages to the customers, and the stanchions may include sensors that allow for detection of certain statuses of the stanchions (e.g., detect where certain items were placed and detect when supplied bags need to be reloaded).

Figure 1:
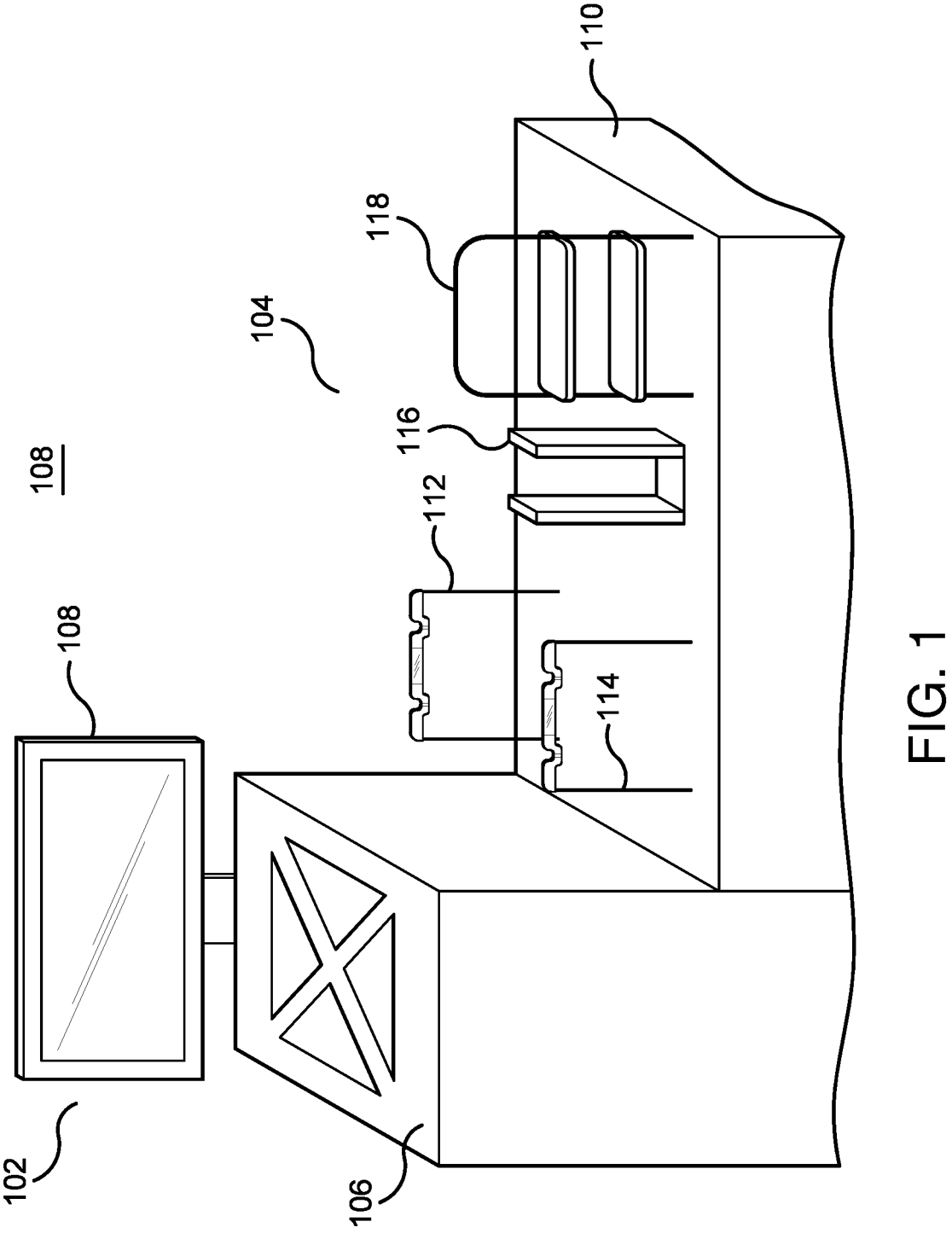
FIG. 1 illustrates an example system.

FIG. 1 illustrates an example system 100. Generally, the system 100 may be a checkout system that scans and stores items. As seen in FIG. 1, the system 100 includes a scanning station 102 and a bagging station 104. The scanning station 102 includes a scanner 106 and a display 108. The bagging station 104 includes a bagging structure 110 and multiple stanchions 112, 114, 116, and 118 attached to the bagging structure 110. Generally, a user of the system 100 may scan an item using the scanning station 102 and then place the item into the bagging station 104.

The scanner 106 may be any suitable device for detecting information about an item. For example, the scanner 106 may be an optical scanner or camera that captures an image of the item. As another example, the scanner 106 may be a barcode scanner that scans a barcode (e.g., a linear barcode, a two-dimensional bar code, etc.) on the item. The user may move an item over the scanner 106 to scan the item. The system 100 may use the information from the scan (e.g., in the scanned barcode) to identify the item that was scanned.

The display 108 may present information about scanned items to the user. For example, the display 108 may present an image and the name of the scanned item. As another example, the display 108 may present a weight or price of the scanned item. The display 108 may also present instructions to the user for how to complete a transaction using the system 100.

After a user has scanned the item, the user may move the item to the bagging station 104. As seen in FIG. 1, the bagging station 104 includes a bagging structure 110 with multiple stanchions 112, 114, 116, and 118 placed on top of the bagging structure 110. Each of the stanchions 112, 114, 116, and 118 may provide a different storage mechanism for the item. For example, the stanchions 112 and 114 may be bag stanchions that hold plastic bags or reusable bags. The user may place the item into a plastic bag or reusable bag held by the bag stanchions 112 and 114. As another example, the stanchion 116 may be a bag stanchion that holds paper bags. The user may move the scanned item into a paper bag held by the bag stanchion 116. As another example, the stanchion 118 may be a shelf stanchion. The user may place the item onto a shelf of the shelf stanchion 118 for holding or storage.

In certain embodiments, the bagging structure 110 defines a grid or an array of cavities through which the various stanchions 112, 114, 116, and 118 may be inserted. This grid of cavities allows the stanchions 112, 114, 116, and 118 to be positioned at different locations on the bagging structure 110. Additionally, different stanchions may be added or removed from the system 100 by inserting or removing those stanchions from the grid of cavities of the bagging structure 110. As a result, the grid of cavities allows the bagging station 104 to be modified or customized to suit particular needs or objectives.

Figure 2A:
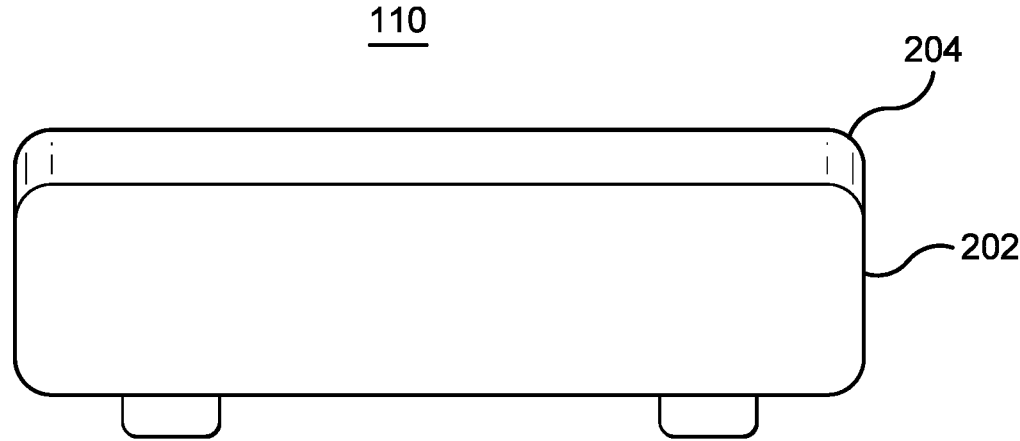
FIGS. 2A, 2B, and 2C illustrate an example bagging structure of the system of FIG. 1.
Figure 2B:
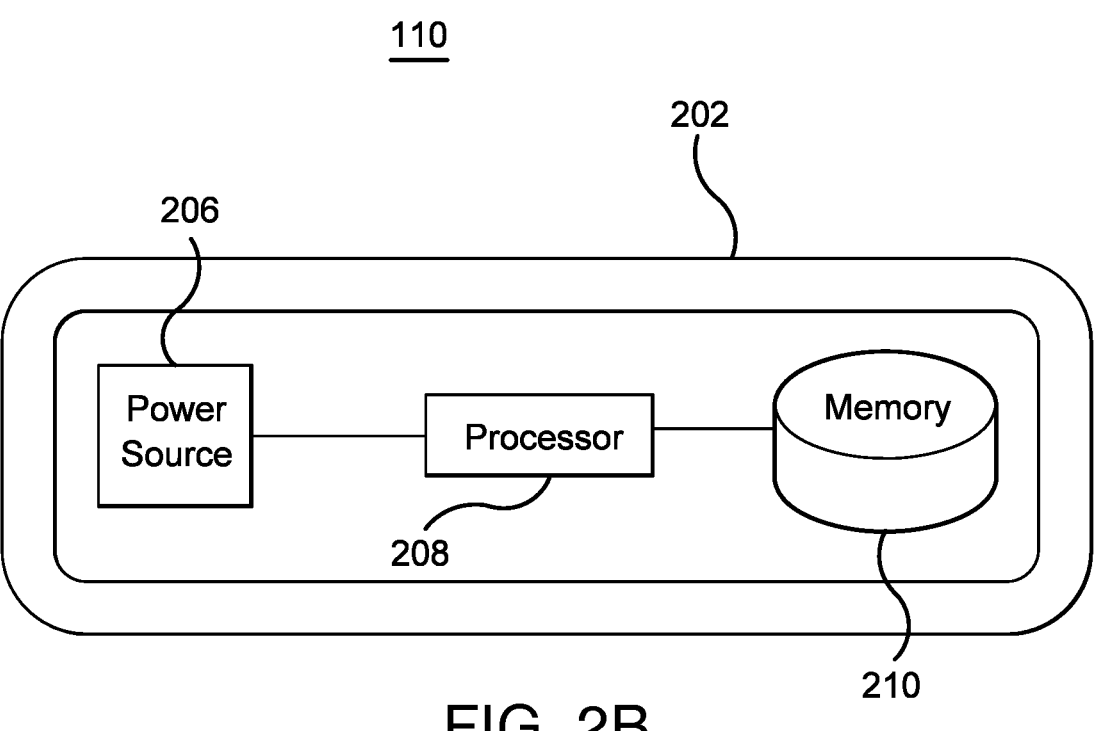
Figure 2C:
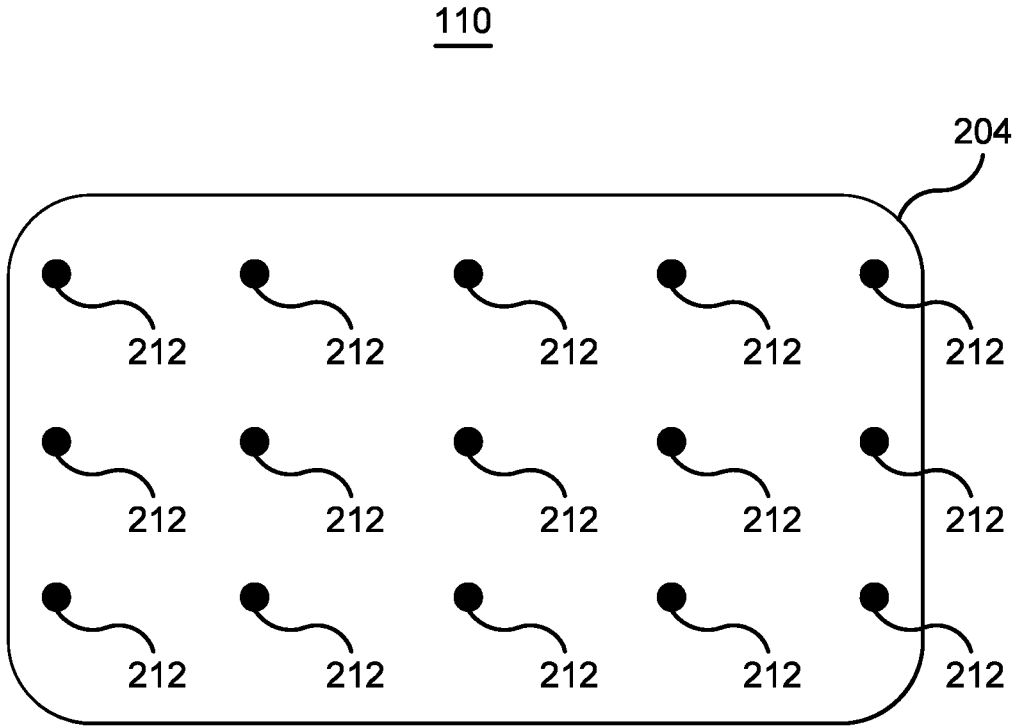

FIGS. 2A, 2B, and 2C illustrate an example bagging structure 110 of the system 100 of FIG. 1. FIG. 2A provides a side view of the bagging structure 110. As seen in FIG. 2A, the bagging structure 110 includes a body 202 and a platform 204 positioned on top of the body 202. Generally, the body 202 provides support for the platform 204 and houses other components positioned within the body 202. Legs, footings, or other support mechanisms may be positioned beneath the body 202, or the body 202 may rest on the ground. The body 202 may be made of any suitable material including plastic and/or metal.

The platform 204 rests on top of the body 202. As discussed previously, the platform 204 may define a grid or an array of cavities through which stanchions may be inserted and secured. The platform 204 may also provide a top cover for the body 202 to shield components that are housed within the body 202. The platform 204 may be lifted off the body 202 or removed from the body 202 to expose the components housed within the body 202. The platform 204 may be made of any suitable material including plastic and/or metal.

FIG. 2B provides a top-down view of the bagging structure 110 with the platform 204 removed. Thus, FIG. 2B shows the interior of the body 202. As seen in FIG. 2B, the body 202 may hold various components that are used in the system 100. For example, the body 202 may contain a power source 206, a processor 208, and a memory 210. The power source 206 may supply electrical power to various components attached to the bagging structure 110. For example, the power source 206 may provide electrical power to various stanchions attached to the platform 204. The electrical power may power lights and sensors attached to each of the stanchions. The processor 208 and the memory 210 may control the operation of other components of the bagging structure 110. For example, the processor 208 and the memory 210 may control the operation of the power source 206 and the lights and sensors attached to the stanchions.

The processor 208 is any electronic circuitry, including, but not limited to one or a combination of microprocessors, microcontrollers, application specific integrated circuits (ASIC), application specific instruction set processor (ASIP), and/or state machines, that communicatively couples to memory 210 and controls the operation of the other components of the bagging station 104. The processor 208 may be 8-bit, 16-bit, 32-bit, 64-bit or of any other suitable architecture. The processor 208 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 208 may include other hardware that operates software to control and process information. The processor 208 executes software stored on the memory 210 to perform any of the functions described herein. The processor 208 controls the operation and administration of the other components of the bagging station 104 by processing information (e.g., information received from the sensors and memory 210). The processor 208 is not limited to a single processing device and may encompass multiple processing devices.

The memory 210 may store, either permanently or temporarily, data, operational software, or other information for the processor 208. The memory 210 may include any one or a combination of volatile or non-volatile local or remote devices suitable for storing information. For example, the memory 210 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 210, a disk, a CD, or a flash drive. In particular embodiments, the software may include an application executable by the processor 208 to perform one or more of the functions described herein.

FIG. 2C illustrates a top-down view of the bagging structure 110 with the platform 204 in place (e.g., resting on the body 202). As seen in FIG. 2C, the top surface of the platform 204 defines a grid or array of cavities 212. Each cavity 212 may extend through or partially through the platform 204. In certain embodiments, one or more stanchions may be inserted into or through one or more of the cavities 212 defined by the platform 204. The stanchions may further be secured to the platform 204 through the cavities 212. The stanchions may be inserted into or through any of the cavities 212 on the platform 204. As a result, the position or location of the stanchions may be moved by inserting and securing the stanchions through different cavities 212 on the platform 204. Additionally, different types of stanchions may be inserted through the cavities 212 or removed from the cavities 212. Thus, the bagging structure 110 may be modified or customized to suit many different needs.

In certain embodiments, unused cavities 212 are capped to prevent objects or fluids from traveling through the cavities into the body 202. The caps may be formed using any suitable material (e.g., plastic, rubber, metal, etc.). When a stanchion 112, 114, 116, or 118 is removed from the bagging structure 110, caps may be added to fill in the cavities 212 in which or through which the stanchions 112, 114, 116, or 118 were previously inserted. When a stanchion 112, 114, 116, or 118 is to be added to the bagging structure 110, caps may be removed to open certain cavities 212. The stanchion 112, 114, 116, or 118 may then be inserted in or through the cavities 212.

Figure 3:
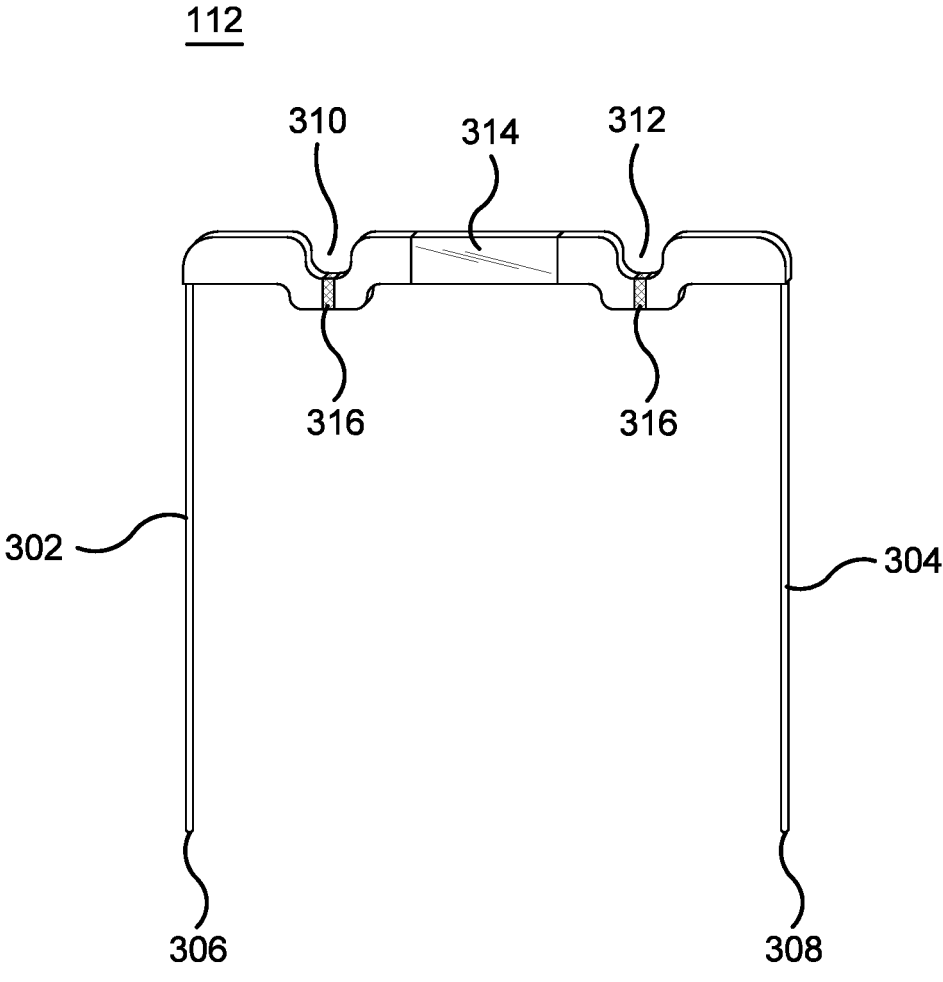
FIG. 3 illustrates an example stanchion of the system of FIG. 1.

FIG. 3 illustrates an example stanchion 112 of the system 100 of FIG. 1. As discussed previously, the stanchion 112 may be a bag stanchion that holds plastic bags or reusable bags. As seen in FIG. 3, the stanchion 112 includes a mechanical rod 302 and a mechanical rod 304. The mechanical rod 302 and the mechanical rod 304 are positioned at opposite lateral ends of the stanchion 112. Additionally, the mechanical rods 302 and the 304 include ends 306 and 308, respectively, that may be inserted into or through the cavities 212 defined by the platform 204 to secure the stanchion 112 to the platform 204.

The stanchion 112 may also include a structure 309 connected between the tops of the mechanical rods 302 and 304. The structure 309 may bend to define pits 310 and 312 across the structure 309. The pits 310 and 312 may be used to hold or secure handles of plastic bags or reusable bags. The handles of the plastic bags or reusable bags may be hung on the pits 310 and 312 to secure the plastic bags or reusable bags to the stanchion 112.

The stanchion 112 may also include a light 314. The light 314 may be positioned on any suitable portion of the stanchion 112. In the example of FIG. 3, the light 314 is positioned on the structure 309 between the pits 310 and 312. The light 314 or additional lights 314 may be positioned on the mechanical rods 302 and 304, or on other parts of the structure 309. In some embodiments, the stanchion 112 may include a base that connects between the ends 306 and 308 of the mechanical rods 302 and 304. The light 314 or additional lights 314 may be positioned on or around the base. The light 314 may be powered by the power source 206 in the body 202 of the bagging structure 110. The light 314 may be illuminated to indicate any suitable status of the stanchion 112. For example, the light 314 may be illuminated to indicate to a user that a scanned item should be stored using the stanchion 112 (e.g., placed in a bag held by the stanchion 112). As another example, the light 314 may illuminate to indicate that the stanchion 112 should be reloaded with bags.

The stanchion 112 may include one or more sensors 316. The sensors 316 or additional sensors 316 may be positioned on any suitable portion of the stanchion 112. In the example of FIG. 3, the sensors 316 are positioned on the structure 309 by the pits 310 and 312. The sensors 316 may be positioned on other portions of the structure 309, on the mechanical rods 302 or 304, and/or on a base connected between the ends 306 and 308 of the mechanical rods 302 and 304. The sensors 316 may be powered by the power source 206 in the body 202 of the bagging structure 110. The sensors 316 may be any suitable sensors. For example, the sensors 316 may be weight sensors that detect a weight of bags or items hanging on the stanchion 112. The detected weights may then be used to determine which items have been placed in the bags hanging on the stanchion 112, or the detected weights may be used to determine when the stanchion 112 has run out of bags and should be reloaded.

Figure 4:
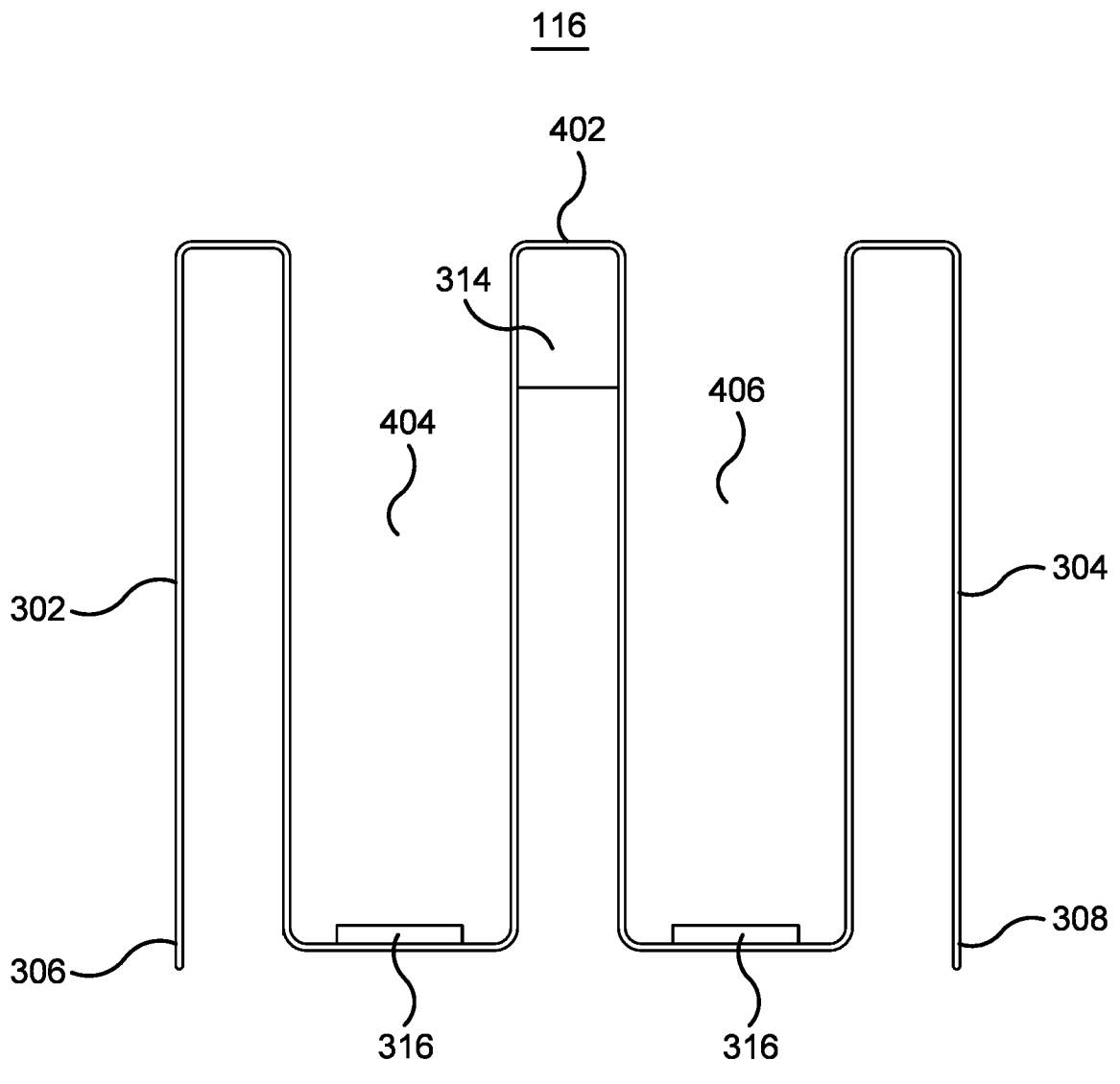
FIG. 4 illustrates an example stanchion of the system of FIG. 1.

FIG. 4 illustrates an example stanchion 116 of the system 100 of FIG. 1. As discussed previously, the stanchion 116 may be a bag stanchion that holds paper bags. As seen in FIG. 4, the stanchion 116 includes the mechanical rods 302 and 304. The mechanical rods 302 and 304 include the ends 306 and 308, respectively, that may be inserted into and secured through the cavities 212 defined by the platform 204 of the bagging structure 110.

Additionally, the stanchion 116 includes a structure 402 connected between the mechanical rods 302 and 304. The structure 402 bends to define pits 404 and 406. The structure 402 may define any suitable number of pits. The pits 404 and 406 may be sized to hold paper bags. For example, paper bags may be opened and placed within the pits 404 and 406 to hold those paper bags. Items may then be placed into the opened paper bags.

The stanchion 116 also includes the light 314. In the example of FIG. 4, the light 314 is positioned on the structure 402. The light 314 or additional lights 314 may be positioned on any suitable portion of the stanchion 116, such as on the mechanical rods 302 and 304 or on a base connected between the ends 306 and 308 of the mechanical rods 302 and 304. The light 314 may be powered by the power source 206 in the body 202 of the bagging structure 110. The light 314 may be illuminated to indicate any suitable status of the stanchion 116. For example, the light 314 may be illuminated to indicate that an item should be stored using the stanchion 116 (e.g., placed in a paper bag in the stanchion 116).

The stanchion 116 also includes one or more sensors 316. In the example of FIG. 4, the sensors 316 are positioned in the pits 404 and 406. The sensors 316 or additional sensor 316 may be positioned on any suitable portion of the stanchion 116. For example, the sensors 316 may be positioned on the mechanical rods 302 and 304, or on a base connected between the ends 306 and 308 of the mechanical rods 302 and 304. The sensors 316 may take any suitable measurement. For example, the sensors 316 may be weight sensors that detect when an item has been placed in a bag in one of the pits 404 and 406.

Figure 5:
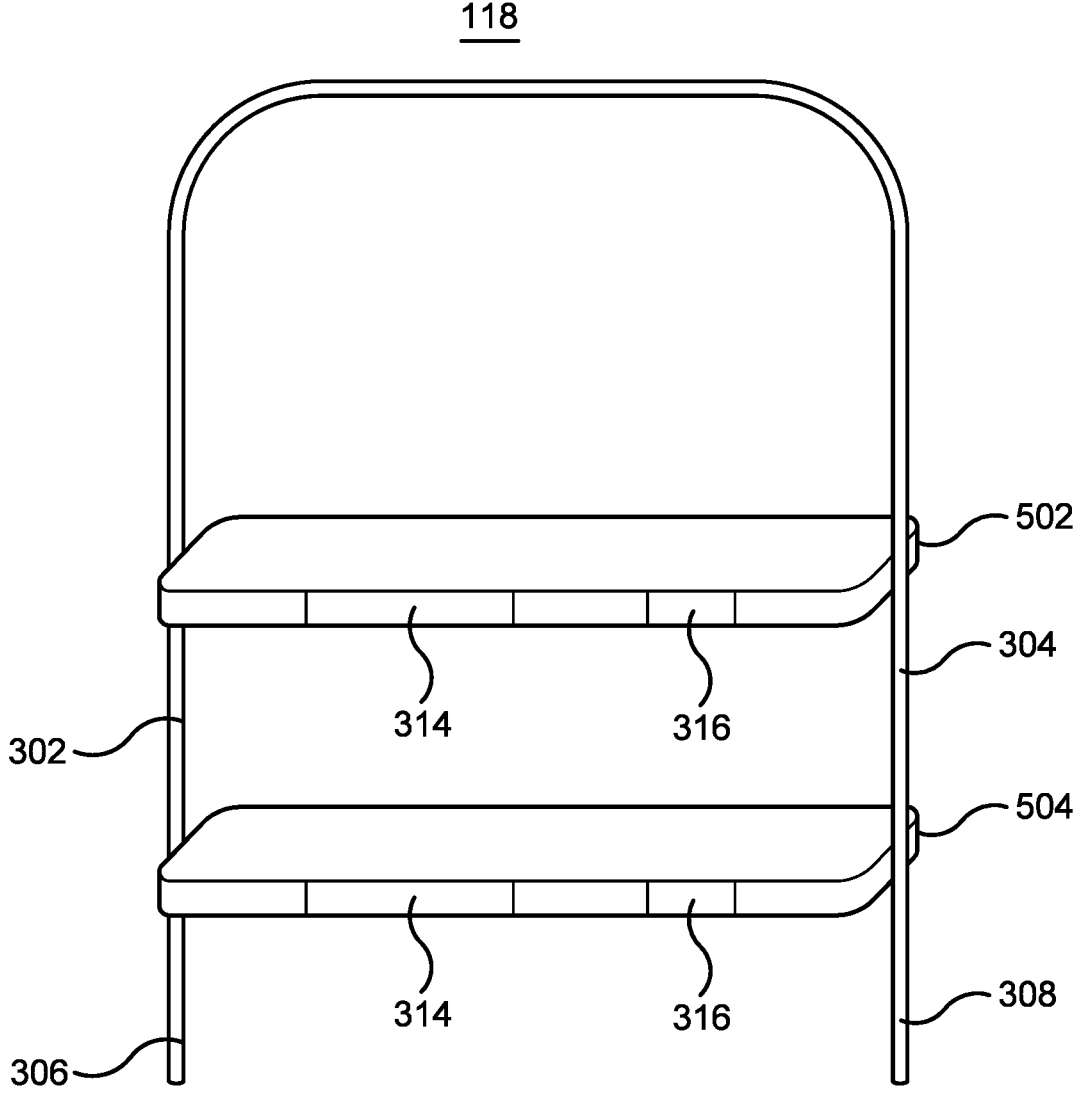
FIG. 5 illustrates an example stanchion of the system of FIG. 1.

FIG. 5 illustrates an example stanchion 118 of the system 100 of FIG. 1. As discussed previously, the stanchion 118 may be a shelf stanchion. As seen in FIG. 3, the stanchion 118 includes the mechanical rods 302 and 304. The mechanical rods 302 and 304 include the ends 306 and 308 that may be inserted and secured through the cavities 212 defined by the platform 204 of the bagging structure 110. Additionally, a shelf 502 and a shelf 504 are connected between the mechanical rods 302 and 304. The user may move items onto the shelves 502 and 504 for storage.

The stanchion 118 also includes lights 314. In the example of FIG. 5, the lights 314 are positioned on the shelves 502 and 504. The lights 314 or additional lights 314 may be positioned on the mechanical rods 302 and 304, or on a base connected between the ends 306 and 308 of the mechanical rods 302 and 304. The lights 314 may be powered by the power source 206 in the body 202 of the bagging structure 110. The lights 314 may illuminate to indicate to a user that an item should be stored using the stanchion 118 (e.g., moved to or placed on the shelves 502 or 504).

The stanchion 118 also includes the sensors 316. In the example of FIG. 5, the sensors 316 may be positioned on the shelves 502 and 504. The sensors 316 or additional sensors 316 may be positioned on the mechanical rods 302 and 304, or on a base connected between the ends 306 and 308 of the mechanical rods 302 and 304. The sensors 316 may be powered by the power source 206 in the body 202 of the bagging structure 110. The sensors 316 may take any suitable measurements. For example, the sensors 316 may be weight sensors that detect a weight of items positioned on the shelves 502 and 504. The detected weights may be used to detect when certain items have been placed on the shelves 502 and 504.

Figure 6A:
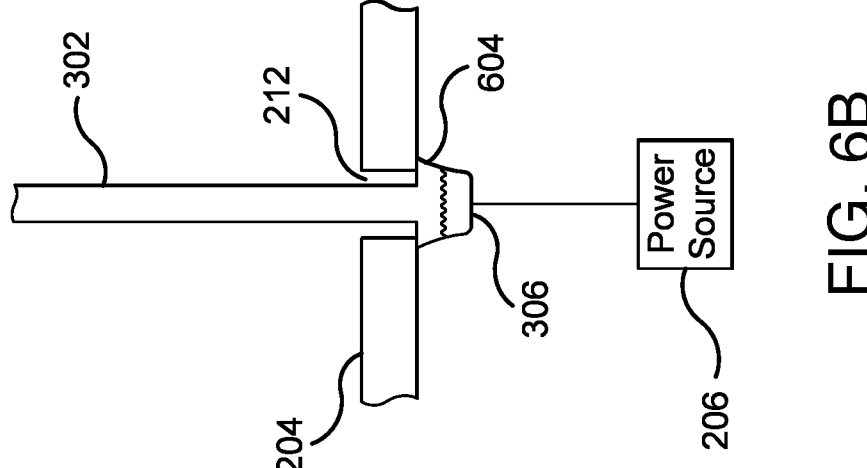
FIGS. 6A and 6B illustrate example mechanical rods of the system of FIG. 1.
Figure 6B:
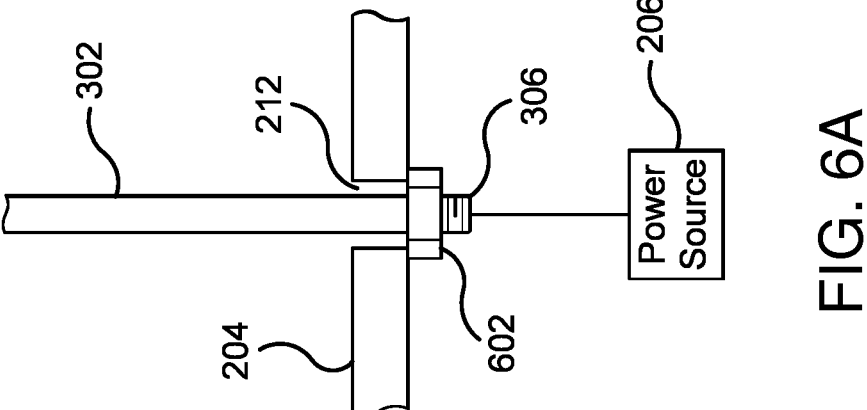

FIGS. 6A and 6B illustrate example mechanical rods 302 of the system 100 of FIG. 1. The features of the mechanical rods 302 shown in FIGS. 6A and 6B may be similarly used for the mechanical rod 304. Generally, the mechanical rods 302 may include different mechanisms to secure the mechanical rods 302 to or through a cavity 212 defined by the platform 204.

As seen in FIG. 6A, the mechanical rod 302 includes the end 306. The end 306 may be a threaded end that may be inserted into or through the cavity 212 defined by the platform 204. A nut 602 (or any suitable threaded collar) may be screwed onto the end 306 to secure the mechanical rod 302 in or through the cavity 212. For example, the nut 602 may be wider or larger than the cavity 212 so that the nut 602 presses against the platform 204 to hold the mechanical rod 302 in place. To remove the mechanical rod 302 from the cavity 212, the nut 602 may be unscrewed from the end 306 and the mechanical rod 302 may be removed from the cavity 212. In some embodiments, the mechanical 302 includes a collar above the end 306 that contacts the top surface of the platform 204 when the mechanical rod 302 is inserted into the cavity 212 to prevent the mechanical 302 from being inserted further into the cavity 212.

Additionally, the power source 206 may connect to the mechanical rod 302 when the mechanical rod 302 is inserted in or through the cavity 212. For example, the platform 204 or the cavity 212 may include pogo pins or contacts that connect the power source 206 to the mechanical rod 302. The power source 206 may then supply electrical power to the lights 314 and the sensors 316 connected to the mechanical rod 302. In this manner, the power source 206 provides electrical power to the mechanical rod 302 through the cavity 212.

As seen in FIG. 6B, the mechanical rod 302 includes a spring mechanism 604 at the end 306. The end 306 may be inserted in or through the cavity 212, and the spring mechanism 604 may secure the mechanical rod 302. For example, the spring mechanism 604 may be a springlock that opens or expands when the springlock has been inserted in or through the cavity 212. The springlock then holds the mechanical rod 302 in the cavity 212. As another example, the spring mechanism 604 may be a ball spring that opens or locks when the ball spring has been inserted through the cavity 212. The ball spring may then hold the mechanical rod 302 through the cavity 212. To remove the mechanical rod 302 from the cavity 212, the spring mechanism 604 may be unlocked or closed by applying mechanical pressure or force to the spring mechanism. The mechanical rod 302 may then be removed from the cavity 212. In some embodiments, the mechanical 302 includes a collar above the end 306 that contacts the top surface of the platform 204 when the mechanical rod 302 is inserted into the cavity 212 to prevent the mechanical 302 from being inserted further into the cavity 212.

The power source 206 may be connected to the end 306 of the mechanical rod 302 when the mechanical rod 302 is inserted in or through the cavity 212. For example, the platform 204 or the cavity 212 may include pogo pins or contacts that connect the power source 206 to the mechanical rod 302. The power source 206 may then supply electrical power to the mechanical rod 302 through the cavity 212 to power the lights 314 or the sensors 316 connected to the mechanical rod 302.

Figure 7:
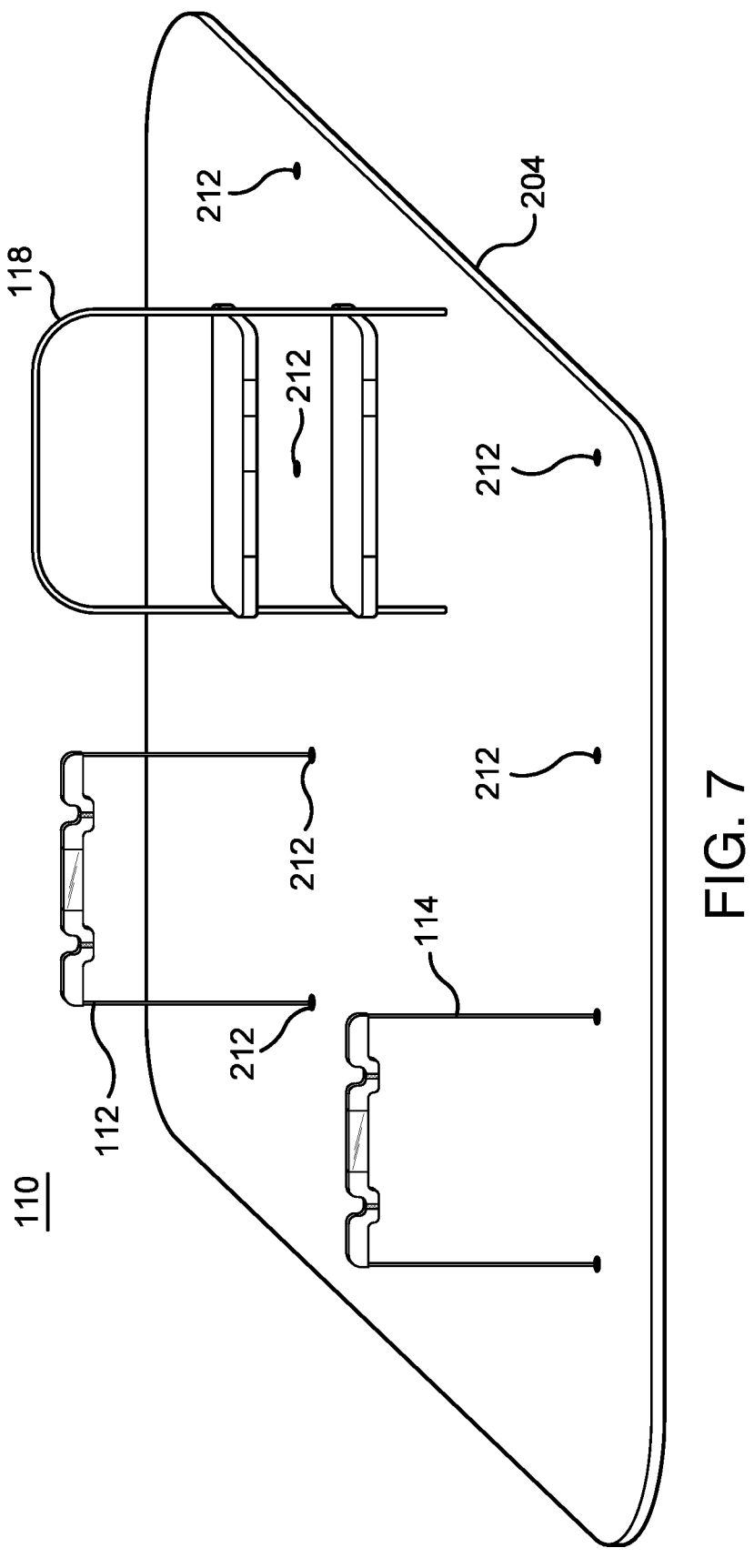
FIG. 7 illustrates an example bagging station of the system of FIG. 1.

FIG. 7 illustrates an example bagging structure 110 of the system 100 of FIG. 1. As seen in FIG. 7, the bagging structure 110 includes the platform 204 that defines the grid or array of cavities 212. The stanchions 112, 114, and 118 are inserted in or through some of the cavities 212 defined by the platform 204 and secured to the platform 204 through these cavities 212. Notably, the stanchions 112, 114, and 118 may be removed from the cavities 212 and inserted and secured through other cavities 212 defined by the platform 204 to move the stanchions 112, 114, and 118 to different positions on the platform 204. Additionally, more stanchions may be added by inserting those stanchions through the available cavities 212 defined by the platform 204. Moreover, some of the stanchions 112, 114, and 118 may be removed from the bagging structure 110 by removing or lifting the stanchions 112, 114, and 118 out of the cavities 212. In this manner, the bagging structure 110 may be modified or customized to suit many different needs.

Figure 8:
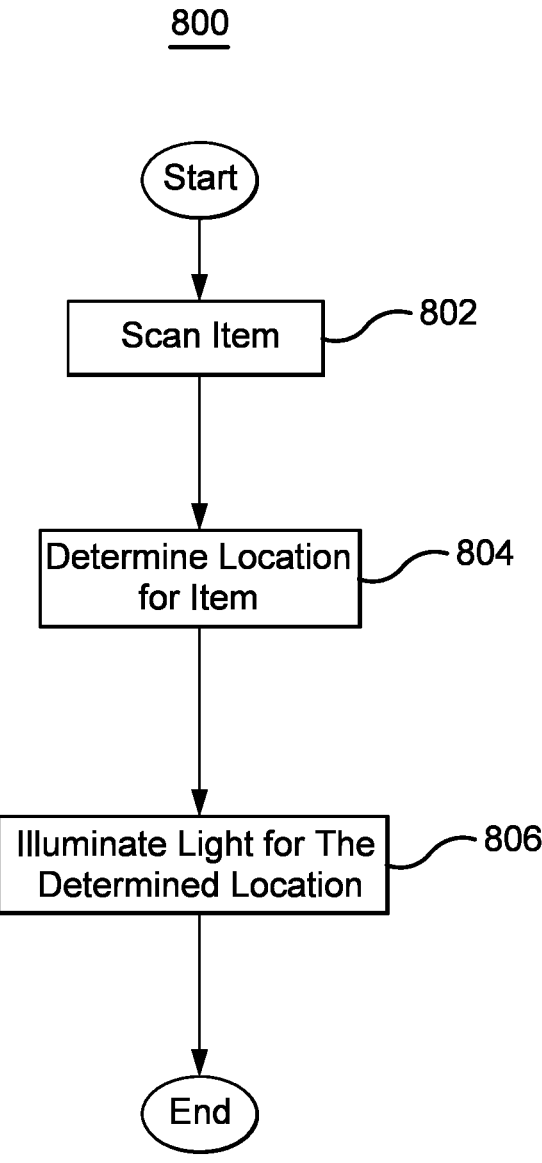
FIG. 8 is a flowchart of an example method performed in the system of FIG. 1.

FIG. 8 is a flowchart of an example 800 performed in the system 100 of FIG. 1. In particular embodiments, various components of the system 100 may perform the steps of the method 800. By performing the method 800, the system 100 may instruct a user where to place a scanned item.

In block 802, the scanner 106 scans an item. For example, a user may move the item over the scanner 106. The scanner 106 may be a barcode scanner that scans a barcode on the item. The scanned information may be used to identify the scanned item.

The processor 208 may determine a location for the scanned item in block 804. The processor 208 may determine the location based on a type of the item or a weight of the item. For example, the processor 208 may determine that the scanned item should be placed in a new bag or placed on top of other items that are already placed in a bag. The processor 208 may determine a stanchion 112, 114, 116, or 118 to which the scanned item should be moved.

In block 806, the processor 208 illuminates a light 314 for the determined location. For example, if the processor 208 determines that the scanned item should be moved to a bag held by a stanchion 112, 114, or 116 or onto a shelf 502 of the stanchion 118, the processor 208 may illuminate a light 314 on the stanchion 112, 114, 116, or 118. When the user sees the illuminated light, the user may know to move the item to a bag or shelf 502 of the stanchion 112, 114, 116, or 118.

Figure 9:
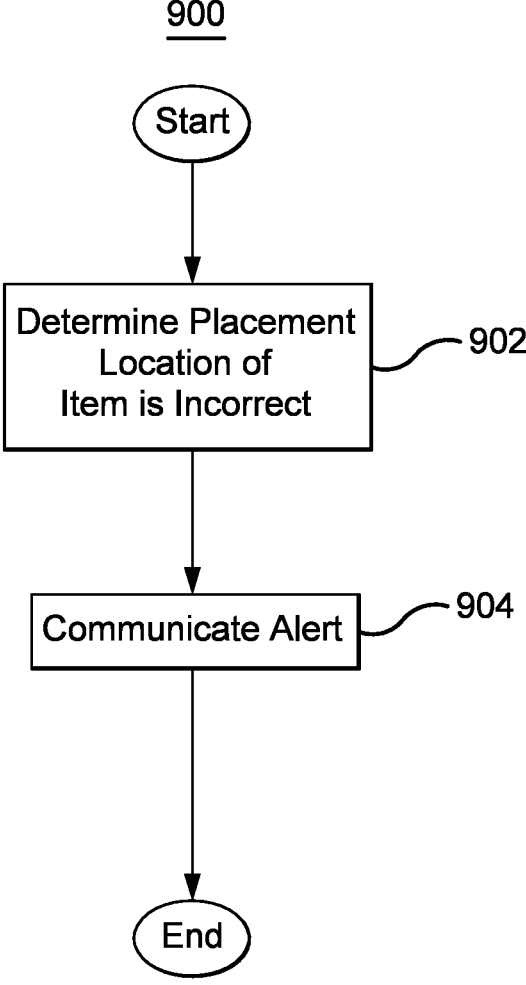
FIG. 9 is a flowchart of an example method performed in the system of FIG. 1.

FIG. 9 is a flowchart of an example method 900 performed in the system 100 of FIG. 1. Generally, the method 900 may be performed after the method 800. In particular embodiments, various components of the system 100 perform the method 900. By performing the method 900, the system 100 communicates an alert when the system 100 determines that an item has been improperly moved.

In block 902, the processor 208 determines that a placement location of an items in incorrect. The processor 208 may determine where an item has been placed using measurements made by weight sensors 316 on the stanchions 112, 114, 116, or 118. For example, if a weight sensor 316 detects an increased weight on a particular stanchion 112, 114, 116, or 118, the processor 208 may determine that an item has been placed into a bag or onto a shelf 502 of the stanchion 112, 114, 116, or 118. If the processor 208 determines that the item was placed with the incorrect stanchion 112, 114, 116, or 118, the processor 208 may determine that the placement location of the item is incorrect.

In block 904, the processor 208 communicates an alert indicating that the item has been placed in the incorrect location. For example, the processor 208 may illuminate a light 314 on the stanchion 112, 114, 116, or 118 at which the item has been incorrectly placed. The processor 208 may change the color of the light 314 to be an alert color (e.g., a flashing red light). In this manner, the processor 208 may alert the customer that the item has been placed in the incorrect location. The processor 208 may also illuminate another light 314 on another stanchion 112, 114, 116, or 118 to indicate the correct placement location for the item.

Figure 10:
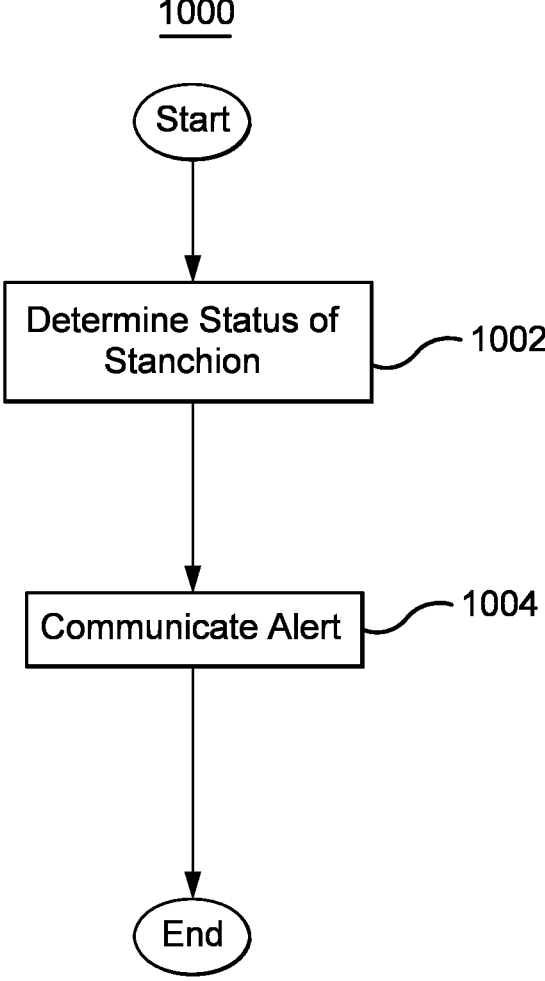
FIG. 10 is a flowchart of an example method performed in the system of FIG. 1.

FIG. 10 is a flowchart of an example method 1000 performed in the system 100 of FIG. 1. In particular embodiments, various components of the system 100 perform the method 1000. By performing the method 1000, the system 100 may communicate the status of a stanchion 112, 114, 116, or 118.

In block 1002, the processor 208 determines a status of a stanchion 112, 114, 116, or 118. For example, the processor 208 may use measurements of the sensors 316 of the stanchion 112, 114, 116, or 118 to determine the status of the stanchion 112, 114, 116, or 118. As an example, the processor 208 may determine, based on measurements made by a weight sensor 316, that a bag stanchion 112 or 114 has run out of plastic bags and should be reloaded with plastic bags.

In block 1004, the processor 208 illuminates a light 314 to indicate the status of the stanchion 112, 114, 116, or 118. Using the previous example, if the processor 208 determines that a bag stanchion 112 or 114 should be reloaded with plastic bags, then the processor 208 may illuminate a light 314 on the bag stanchion 112 or 114 to indicate that the bag stanchion 112 or 114 needs to be reloaded with plastic bags. The processor 208 may change the color of the illuminated light 314 to indicate the status of the stanchion 112 or 114. For example, the processor 208 may use a flashing orange or yellow light to indicate that the bag stanchion 112 or 114 should be reloaded with plastic bags.

As another example, the processor 208 may illuminate a light 314 after the checkout process is complete to indicate that items are placed with the stanchion 112, 114, 116, or 118 (e.g., placed in a bag or on a shelf 502). The processor 208 may use detections from weight sensor 316 of the stanchions 112, 114, 116, or 118 to determine which stanchions 112, 114, 116, or 118 are holding items. The processor 208 may then illuminate the lights 314 on those stanchions 112, 114, 116, or 118 that are holding items to indicate that items should be removed from those stanchions 112, 114, 116, or 118. In this manner, the processor 208 helps a user not to forget purchased items.

In summary, a checkout system 100 (e.g., a self-checkout system) includes a bagging station 104 with a modifiable bagging structure 110. The bagging structure 110 includes a platform 204 that defines a grid or array of cavities 212. Various stanchions 112, 114, 116, and 118 (e.g., bag stanchions and shelf stanchions) may be inserted and secured through the cavities 212. The stanchions 112, 114, 116, and 118 and the position of the stanchions 112, 114, 116, and 118 may be varied by inserting and securing different stanchions 112, 114, 116, and 118 through different cavities 212 of the bagging structure 110. Additionally, the modifiable bagging structure 110 may include a power source 206 that supplies electrical power to the stanchions 112, 114, 116, and 118.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

Embodiments of the present disclosure may include a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data process- ing apparatus, or other device to cause a series of operational steps to be performed on the computer, other programmable apparatus or other device to produce a computer imple- mented process, such that the instructions which execute on the computer, other programmable apparatus, or other device implement the functions/acts specified in the flow- chart and/or block diagram block or blocks.

The flowchart and block diagrams in the Figures illustrate the architecture, functionality, and operation of possible implementations of systems, methods, and computer pro- gram products according to various embodiments of the present disclosure. In this regard, each block in the flowchart or block diagrams may represent a module, segment, or portion of instructions, which comprises one or more executable instructions for implementing the specified logi- cal function(s). In some alternative implementations, the functions noted in the block may occur out of the order noted in the figures. For example, two blocks shown in succession may in fact, be executed substantially concurrently, or the blocks may sometimes be executed in the reverse order, depending upon the functionality involved. It will also be noted that each block of the block diagrams and/or flowchart illustration, and combinations of blocks in the block dia- grams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A bagging structure for a checkout system, the bagging structure comprising:

a body;

a platform positioned on the body, the platform defining a plurality of cavities arranged in a grid, wherein a first cavity of the plurality of cavities is arranged to receive a first mechanical rod; an electrical contact arranged to contact the first mechanical rod when the first mechani- cal rod is inserted in the first cavity;

a power source disposed within the body, wherein the power source is arranged to provide electric power through the electrical contact and to the first mechani- cal rod to power a first light positioned on a first stanchion coupled to the first mechanical rod when the first mechanical rod is inserted in the first cavity, wherein the first stanchion is a shelf stanchion and further couples to a second mechanical rod, wherein a second cavity of the plurality of cavities is arranged to receive the second mechanical rod; and a second stanchion comprising a third mechanical rod, a fourth mechanical rod, and a second light, wherein a third cavity and a fourth cavity of the plurality of cavities are arranged to receive the third mechanical rod and the fourth mechanical rod, and wherein the power source is arranged to provide electric power through the third cavity and to the third mechanical rod to power the second light.

2. The bagging structure of claim 1, wherein the first stanchion is a bag stanchion or a shelf stanchion.

3. The bagging structure of claim 1, further comprising a memory and a processor communicatively coupled to the memory, wherein the processor is configured to:

determine whether a scanned item should be stored using the first stanchion or the second stanchion;

illuminate the first light in response to determining that the scanned item should be placed according to the first stanchion; and illuminate the second light in response to determining that the scanned item should be placed according to the second stanchion.

4. The bagging structure of claim 3, wherein the first stanchion further comprises a sensor powered by the electric power provided by the power source, and wherein the processor is further configured to determine that the scanned item has been placed according to the first stanchion based on a measurement of the sensor.

5. The bagging structure of claim 1, further comprising a memory and a processor communicatively coupled to the memory, wherein the first stanchion further comprises a sensor powered by the electric power provided by the power source, and wherein the processor is configured to illuminate the first light in response to determining, based on a mea- surement of the sensor, that the first stanchion should be reloaded with bags.

6. The bagging structure of claim 1, further comprising a nut securing the first mechanical rod in the first cavity.

7. The bagging structure of claim 1, further comprising a ball spring securing the first mechanical rod in the first cavity.

8. The bagging structure of claim 1, wherein platform is removable from the body to provide access to the power source.

9. A checkout system comprising:

a scanner arranged to scan an item;

a bagging structure defining a plurality of cavities arranged in a grid, wherein a first cavity of the plurality of cavities is arranged to receive a first mechanical rod of a first stanchion and a second cavity of the plurality of cavities is arranged to receive a second mechanical rod of the first stanchion, wherein a third cavity of the plurality of cavities is arranged to receive a third mechanical rod of a second stanchion and a fourth cavity of the plurality of cavities is arranged to receive a fourth mechanical rod of the second stanchion, wherein the bagging structure comprises an electrical contact arranged to contact the first mechanical rod when the first mechanical rod is inserted in the first cavity; and a power source arranged to:

provide electric power through the electrical contact and to the first mechanical rod to power a first light posi- tioned on the first stanchion when the first mechanical rod is inserted in the first cavity; and provide electric power through the third cavity and to the third mechanical rod to power a second light of the second stanchion; a memory; and a processor communicatively coupled to the memory, wherein the processor is configured to:

illuminate the first light in response to determining that the item should be stored using the first stanchion; and illuminate the second light in response to determining that the item should be stored using the second stanchion.

10. The checkout system of claim 9, wherein the first stanchion is a bag stanchion or a shelf stanchion.

11. The checkout system of claim 9, wherein the first stanchion further comprises a sensor powered by the electric power provided by the power source, and wherein the processor is further configured to determine that the item has been stored using the first stanchion based on a measurement of the sensor.

12. The checkout system of claim 9, wherein the first stanchion further comprises a sensor powered by the electric power provided by the power source, and wherein the processor is further configured to illuminate the first light in response to determining, based on a measurement of the sensor, that the first stanchion should be reloaded with bags.

13. The checkout system of claim 9, further comprising a nut securing the first mechanical rod in the first cavity.

14. The checkout system of claim 9, further comprising a ball spring securing the first mechanical rod in the first cavity.

15. A bagging structure comprising:

a body;

a platform positioned on the body, the platform defining a plurality of cavities arranged in a grid;

a bag stanchion comprising a first mechanical rod and a second mechanical rod, wherein a first cavity of the plurality of cavities receives the first mechanical rod, wherein a second cavity of the plurality of cavities receives the second mechanical rod, and wherein the bag stanchion is arranged to hold a plurality of bags;

an electrical contact arranged to contact the first mechanical rod when the first mechanical rod is inserted in the first cavity; and a power source disposed within the body, wherein the power source is arranged to provide electric power through the electrical contact and to the first mechanical rod to power a light positioned on the bag stanchion when the first mechanical rod is inserted in the first cavity, wherein the first stanchion is a shelf stanchion and further couples to a second mechanical rod, wherein a second cavity of the plurality of cavities is arranged to receive the second mechanical rod; and a second stanchion comprising a third mechanical rod, a fourth mechanical rod, and a second light, wherein a third cavity and a fourth cavity of the plurality of cavities are arranged to receive the third mechanical rod and the fourth mechanical rod, and wherein the power source is arranged to provide electric power through the third cavity and to the third mechanical rod to power the second light.

16. The bagging structure of claim 15 further comprising a memory and a processor communicatively coupled to the memory, wherein the processor is configured to illuminate the light in response to determining that a scanned item should be placed according to the bag stanchion.

* * * * *